(12) United States Patent
Koegel (10) Patent No.: US 8,967,027 B2
(45) Date of Patent: Mar. 3, 2015

(54) MODULAR TABLE SYSTEM FOR TABLE SAWS

(75) Inventor: Jan S. Koegel, Arlington Heights, IL (US)

(73) Assignee: Robert Bosch GmbH, Stuttgart (DE)

( * ) Notice: Subject to any disclaimer, the term of this patent is extended or adjusted under 35 U.S.C. 154(b) by 633 days.

(21) Appl. No.: 12/829,552

(22) Filed: Jul. 2, 2010

(65) Prior Publication Data
US 2012/0000339 A1   Jan. 5, 2012

(51) Int. Cl.
*B23D 45/06*   (2006.01)

(52) U.S. Cl.
USPC ............... 83/435.27; 83/477.2; 144/287

(58) Field of Classification Search
USPC ............... 83/477.2, 435.11, 435.27; 144/287
IPC ........................................... B23D 47/025
See application file for complete search history.

(56) References Cited

U.S. PATENT DOCUMENTS

| | | | | |
|---|---|---|---|---|
| 4,408,509 A | * | 10/1983 | Winchip | .................... 83/435.27 |
| 4,817,693 A | | 4/1989 | Schuler | |
| 4,934,423 A | * | 6/1990 | Withrow | .................... 144/286.1 |
| 4,955,941 A | | 9/1990 | Rousseau | |
| 4,962,685 A | * | 10/1990 | Hagstrom | ....................... 83/397 |
| 5,230,269 A | * | 7/1993 | Shiotani et al. | .............. 83/468.7 |
| 5,819,671 A | | 10/1998 | Ocampo | |
| 5,931,209 A | | 8/1999 | Chang | |
| 6,148,705 A | | 11/2000 | Shieh | |
| 6,189,429 B1 | | 2/2001 | Liu | |
| 6,293,176 B1 | | 9/2001 | Talesky | |
| 6,439,280 B1 | | 8/2002 | Wang | |
| 6,484,614 B1 | | 11/2002 | Huang | |
| 6,619,348 B2 | | 9/2003 | Wang | |
| 6,817,275 B1 | | 11/2004 | Chin-Chin | |
| 6,945,150 B2 | * | 9/2005 | Chang | .................... 83/435.12 |
| 7,337,701 B2 | | 3/2008 | Smith | |
| 7,438,098 B2 | | 10/2008 | Liu et al. | |
| 7,441,487 B2 | | 10/2008 | Liu et al. | |
| 7,490,643 B2 | | 2/2009 | Liu et al. | |
| 7,497,239 B2 | | 3/2009 | Smith | |
| 2001/0047706 A1 | * | 12/2001 | Parks et al. | ................. 83/435.12 |
| 2003/0213349 A1 | * | 11/2003 | Chang | ............................. 83/438 |

FOREIGN PATENT DOCUMENTS

DE         3706921 A1    9/1988
DE    202006007328 U1   7/2006

OTHER PUBLICATIONS

International Search Report in corresponding PCT application (i.e., PCT/US2011/042054), mailed Sep. 5, 2011 (12 pages).

* cited by examiner

*Primary Examiner* — Kenneth E. Peterson
(74) *Attorney, Agent, or Firm* — Maginot Moore & Beck LLP (57) ABSTRACT

A table tool includes a table which carries a power tool. The table includes table base and a table top. The table top includes a central table top portion fixed to the table base. The central table top portion of the table top includes a left perimeter, a right perimeter, and a rear perimeter. A first table top extension is configured to be selectively coupled to the table on the left perimeter, and the right perimeter of the central table top portion with the first table top extension slideable relative to the central table top portion. A second table top extension is configured to be selectively coupled to the left perimeter, the right perimeter, and the rear perimeter of the central table top portion with the second table top extension fixed relative to the central table top portion.

3 Claims, 8 Drawing Sheets

MODULAR TABLE SYSTEM FOR TABLE SAWS

FIELD

This application relates to the field or power tools and particularly to work tables used in association with table saws or other power tools.

BACKGROUND

Table-top power tools are used in a wide variety of applications including wood working and metal working. Table-top power tools are typically mounted to a flat work surface (i.e., the table surface) configured to support a workpiece. The table allows the user to more easily manipulate the workpiece and move the workpiece in relation to a stationary power tool. Alternatively, the table may also be configured to allow the user to move the power tool in relation to the workpiece.

An example of a table-top power tool is a table saw which includes a circular saw blade. The circular saw blade extends through an opening in the table top surface, and a work piece, typically a piece of wood, is placed on the table top for cutting. Some table saws include only stationary saw blades and other table saws allow for linear movement of the saw blade along the surface of the table.

Table saws may be used to cut workpieces of many different sizes ranging from relatively small pieces to relatively large pieces. Accordingly, table saws have been provided in the past with adjustable work surfaces. These table saws typically include sliding or telescoping table surfaces. While these table surfaces have allowed the user to effectively increase or decrease the length of one area of the table, they have remained limited in other respects. In particular, past table surfaces for power tools have generally failed to provide a table surface capable of providing many different configurations and sizes. Accordingly, it would be advantageous to produce a table surface for a power tool that is capable of being arranged in multiple configurations and sizes. It would also be desirable if such table surface were relatively easy to for the user to manipulate and set up for various different types of workpieces and cuts. Furthermore, it would be advantageous if such table surface could be easily incorporated into the table surface by the manufacturer at a relatively small additional cost.

SUMMARY

In accordance with one embodiment of the disclosure, there is provided a table tool comprising a table and a power tool carried by the table. The table includes a base and a table top. The table top includes a central table top portion with an opening configured to receive a cutting instrument of the power tool. The central table top portion defines a front perimeter, a rear perimeter, a right side perimeter and a left side perimeter. A first coupling feature is provided on the central table top portion along the rear perimeter, the right side perimeter, and the left side perimeter. A second coupling feature is provided on a table top extension. The second coupling feature is configured to removably engage the first coupling feature at any one of the rear perimeter, right side perimeter or left side perimeter of the central table top portion and couple the table top extension to the central table top portion. Together, the table top extension and central table top portion provide a table top surface.

The first and second coupling features may be provided in any number of different configurations. In at least one embodiment, the first coupling feature engages the second coupling feature in a C-groove arrangement. In at least one embodiment, the second coupling feature is removably coupled to the table top extension, and the second coupling feature also includes the first coupling feature on a perimeter portion of the table top extension. In this embodiment, the second coupling feature may be provided between the first coupling feature on the table top extension and the first coupling feature on the central table top portion.

In at least one embodiment of the table tool, the table top extension is a first table top extension, and the table further comprises a second table top extension. The second table top extension also includes the second coupling feature configured to removably engage the first coupling feature at any one of the rear perimeter, right side perimeter or left side perimeter of the central table top portion. Together, the second table top extension, first table top extension and central table top portion provide a table top surface. In at least one alternative embodiment, the at least one table top extension includes a primary surface coupled to a secondary surface such that the primary surface and secondary surface together provide a non-rectangular extension surface.

In at least one embodiment of the table tool, the table top extension is configured to slide relative to the central table top portion when second coupling feature of the table top extension engages the first coupling feature of the central table top portion. In another embodiment, the table top further includes a support member that extends between the table top extension and the base of the table.

In at least one embodiment, the table tool further includes a tool accessory which also includes the second coupling feature configured to removably engage the first coupling feature at any one of the rear perimeter, right side perimeter or left side perimeter of the central table top portion.

The above described features and advantages, as well as others, will become more readily apparent to those of ordinary skill in the art by reference to the following detailed description and accompanying drawings. While it would be desirable to provide a table for a power tool that provides one or more of these or other advantageous features, the teachings disclosed herein extend to those embodiments which fall within the scope of the appended claims, regardless of whether they accomplish one or more of the above-mentioned advantages.

DESCRIPTION

Figure 1:
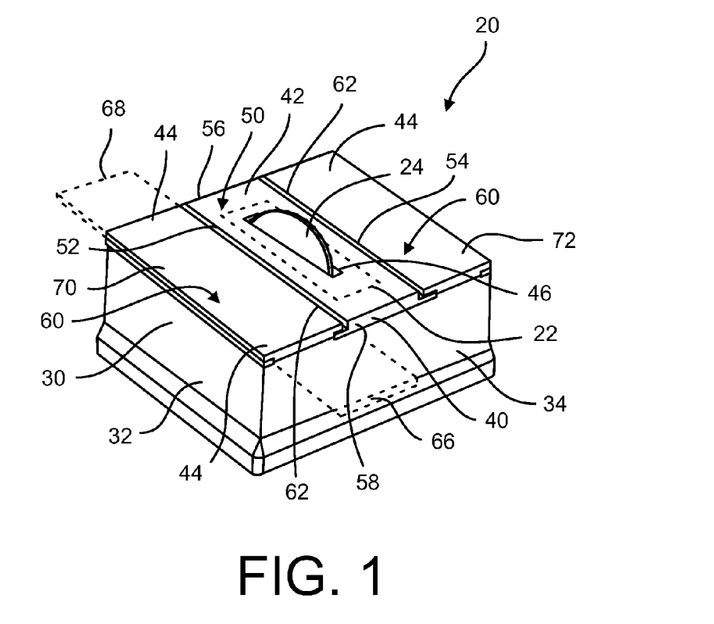
FIG. 1 shows a perspective view of a modular table system for a table saw.

With reference to FIG. 1, a table tool is shown in the form of a table saw 20. The table saw 20 includes a power tool in the form of a saw 22 having a cutting instrument in the form of a circular saw blade 24. The saw 22 is slideably carried by a table 30. The table 30 includes a table base 32 and a modular table top 40 which provides a work surface for the table saw 20. The table top 40 includes a central table top portion 42 and a plurality of table top extension elements 44 which are removably coupled to the central table top portion 42. The table top extension elements 44 may be configured in a number of different ways on the central table top portion 42 in order to provide differently sized and shaped table tops.

As will be recognized by those of skill in the art, the table saw 20 may include a beveling carriage (not shown) that is coupled to the underside of the central table top portion 42. The carriage holds the saw 22 with the circular saw blade 24 extending through an opening 46 in the table top 40. The opening 46 in the table top 40 is generally provided in the form of an elongated slot, allowing the saw blade 24 to move in an axial direction along the table top 40. When electrical power is delivered to the saw 22, the circular saw blade 24 rotates, allowing a user to cut a workpiece positioned on the table top 40. Although the power tool disclosed herein is a saw, it will be recognized that in other embodiments the power tool may be different than a saw. For example, in another alternative embodiment, the power tool with a cutting instrument may be a router or other power tool designed to cut or shape a workpiece.

The table top 40 is supported by the table base 32. The table base 32 generally provides a frame structure that holds the table top 40 in an elevated position above the table base 32. The table base 32 may be provided in any of a number of different forms. In the embodiment of FIG. 1, the table base 32 is provided as a housing structure, including four walls 34. Various table saw controls such as a power switch, pull rod, or bevel adjustment member may be provided on the front wall of the housing. While a table base 32 with walls 34 has been shown in the embodiment of FIG. 1, in other embodiments, the table base may be a frame of metallic support members without walls secured thereto.

The table top 40 rests on the base 32 with the central table top portion 42 fixed to the base 32. The central table top portion 42 (which may also be referred to herein as a "central element" 42) is generally rectangular in shape with a generally planar upper support surface 50. An opening in the form of slot 46 is provided in the planar support surface 50 with the saw blade 24 extending through the slot and above the central element 42. The central element 42 further includes a left perimeter 52, a right perimeter 54, a rear perimeter 56 and a front perimeter 58. As will be explained in further detail below, a first coupling feature is provided on the left, right, rear and front perimeters 52, 54, 56 and 58 of the central element 42. The first coupling feature facilitates connection of the table top extension elements 44 to the central element 42.

In the embodiment of FIG. 1, two table top extension elements 44 (which may also be referred to herein as "extension elements" or "table top extensions") are releasably coupled to the central element 42. Each extension element 44 is generally rectangular in shape with a generally planar upper support surface 60. As will be explained in further detail below, each extension element includes a second coupling feature that is provided on a perimeter 62 of the extension element 44. The second coupling feature is configured to mate with the first coupling feature and connect the extension element 44 to the central element 42 such that an edge of the extension element 44 extends parallel to an edge of the central element 42. Because the first coupling feature is provided on the left, right, rear and front perimeters 52, 54, 56 and 58 of the central element 42, each extension element may be connected to any one of the left, right, rear and front perimeters 52, 54, 56 and 58 of the central element 42. Accordingly, as many as four extension elements 44 may be coupled to the central element 42, i.e., one extension element at each of the left, right, rear and front perimeters 52, 54, 56 and 58 of the central element 42.

In the embodiment of FIG. 1, a first extension element 70 is a slideable extension element and a second extension element 72 is a static extension element. The slideable extension element 70 is configured to slide relative to the central element 42 once the extension element 70 is coupled to the central element 42. This slideable relationship is illustrated in FIG. 1 by dotted lines, which show that the slideable extension element 72 is configured to slide between a forward position 66 and a rear position 68. In contrast to the slideable extension element 70, the static extension element 72 is configured to remain fixed in place relative to the central element 42 once the extension element 72 is coupled to the central element.

Figure 2:
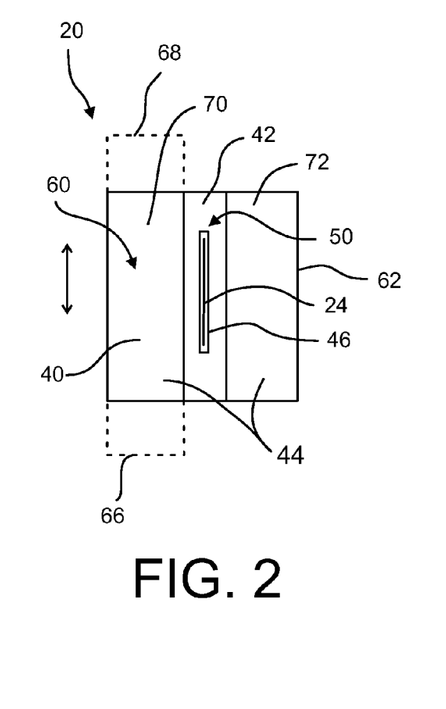
FIG. 2 shows a top view of the modular table system of FIG. 1.
Figure 3:
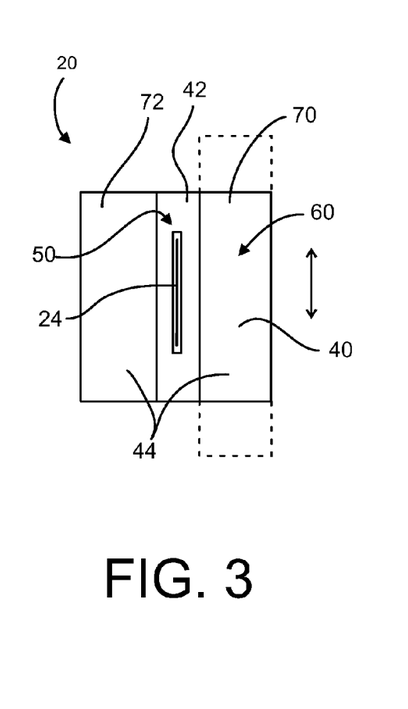
FIG. 3 shows a top view of an alternative configuration for the modular table system of FIG. 1.

FIGS. 2-3 show various configurations that may be achieve using the first and second extension elements 70 and 72. In the configuration of FIG. 2, the slideable extension element 70 is positioned on the left side of the central element 42, and the static extension element 72 is positioned on the right side of the central element 42. Alternatively, as shown in FIG. 3, the slideable extension element 70 may be positioned on the right side of the central element 42, and the static extension element 72 may be positioned on the left side of the central element 42.

Figure 4:
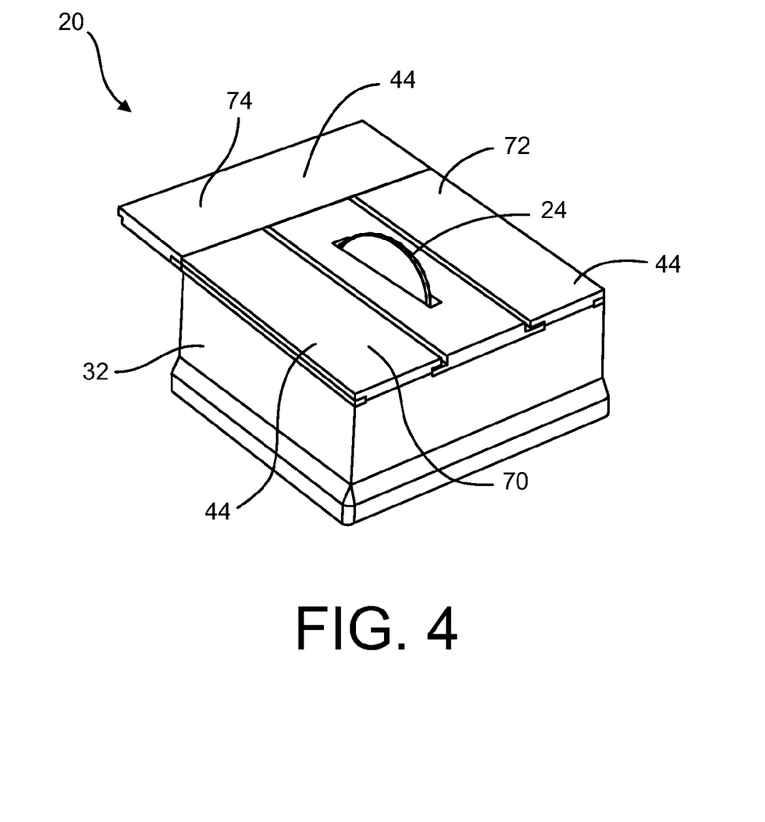
FIG. 4 shows a perspective view of an alternative embodiment of the modular table system of FIG. 1.
Figure 5:
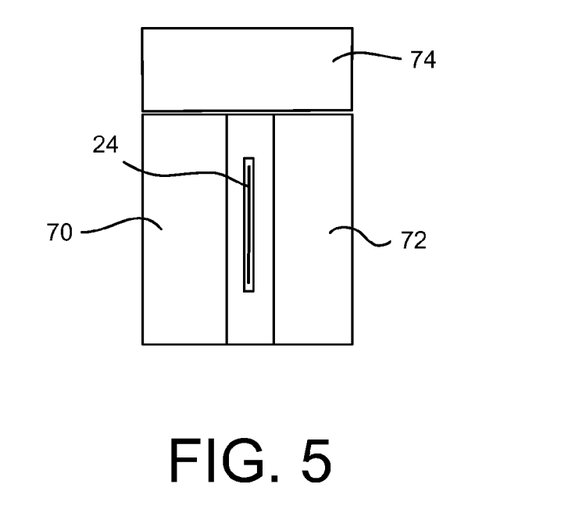
FIG. 5 shows a top view of the modular table system of FIG. 4.

FIGS. 4 and 5 show an additional configuration for the table saw 20 when a third extension element 74 is used in association with the central element 42. In the embodiment of FIGS. 4 and 5, the third extension element 74 is also a static member. The third extension element 74 is coupled to the rear perimeter 56 of the central element 42. The third extension element 74 may also be coupled to the rear perimeter of the first and/or second extension elements 70, 72.

Figure 6:
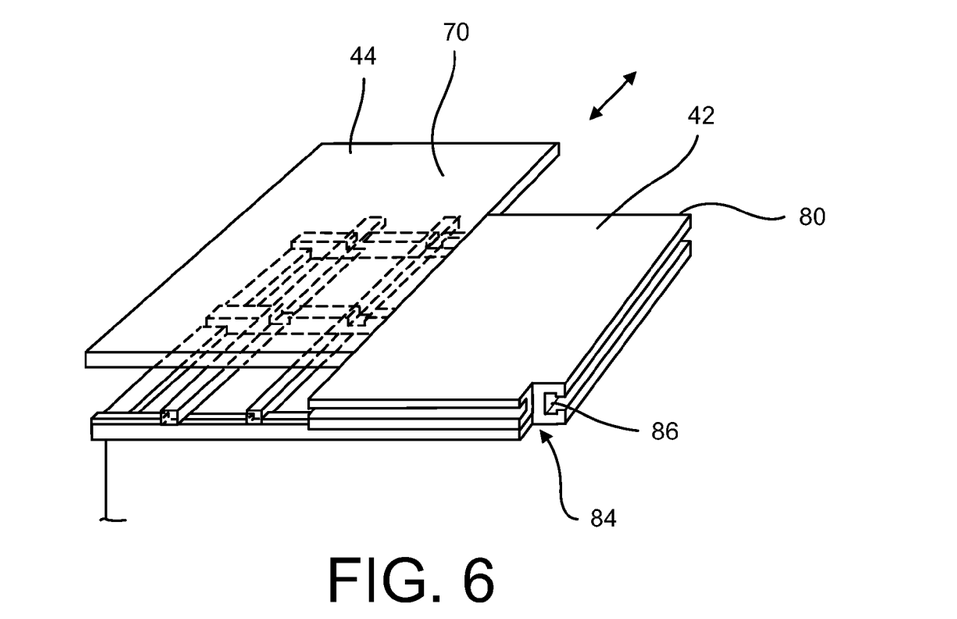
FIG. 6 shows a perspective view of a central table top element for the modular table system of FIG. 1.
Figure 7:
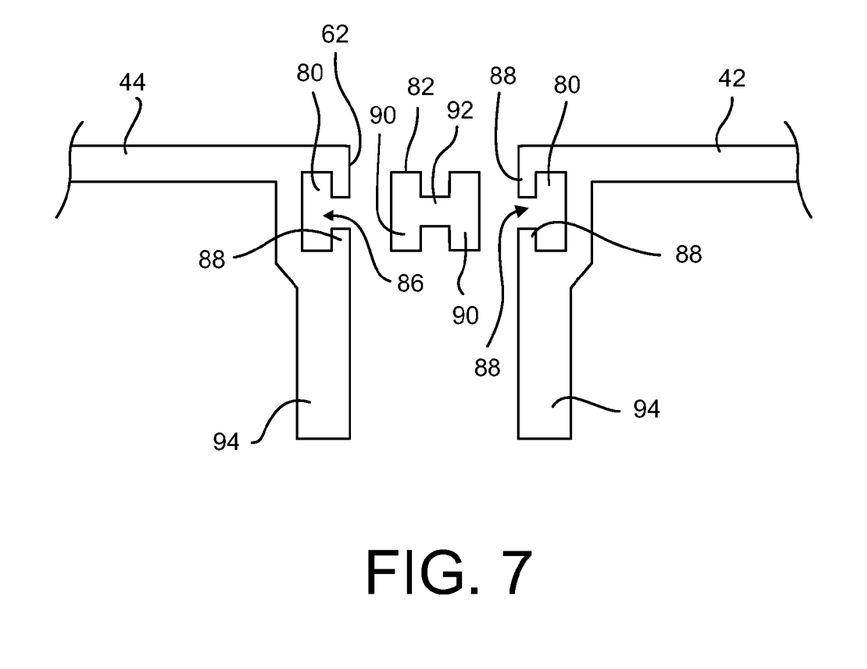
FIG. 7 shows a cross-sectional view of a first and second coupling features for the modular table system of FIG. 1.

With reference now to FIGS. 6 and 7, an arrangement for coupling the extension members 44 to the central element 42 is shown. In the embodiment of FIGS. 6 and 7, the coupling arrangement includes a first coupling feature 80 and a second coupling feature 82. The first coupling feature 80 is provided on the central element 42, and the second coupling feature 82 is provided on or coupled to the extension element 44. In the embodiment of FIG. 6, the first coupling feature is an elongated C-groove 80. The C-groove 80 is provided along each side of the central element 42. In particular, the C-groove extends along the left perimeter 52, right perimeter 54, rear perimeter 56 and front perimeter 58 of the central element 42. The elongated C-groove 80 is oriented with an elongated opening 86 to the C-groove facing outward from each side of the central element 42. Front flanges 88 border the elongated opening 86. The C-groove 80 that extends along the substantial portion of each side terminates at the corner portions 84 of the central element 42. Accordingly, a side opening 86 to the C-groove 80 is provided at the corner portions 84 of the central element 42.

The second coupling feature 80 is complementary to the first coupling feature 82 and is configured to mate with the first coupling feature in a locking relationship. In the embodiment of FIG. 7, the second coupling feature 82 is provided as an elongated bar with an H-shaped cross-section. The elongated bar 82 includes legs 90 and a cross member 92 that together form the H-shape of the bar 82. The legs 90 of one side of the bar 82 are configured to fit within the C-groove 80. In particular, the legs 90 on one side of the bar 82 can be inserted into the C-groove 80 from the corner portion 84, and the bar 80 can be slid in the C-groove in order to fully engage the bar 82 with the C-groove 80. If the extension element 44 is slideable, the H-bar 82 may be configured to slide within the C-groove 80 in order to allow the extension element 44 to slide relative to the central element 42.

The second coupling feature in the form of bar 82 may be fixed to or removably coupled to the extension element 44. FIG. 7 shows an embodiment where the bar 82 is removable relative to the extension element 44. Accordingly, in FIG. 7, the extension element 44 also includes the first coupling feature in the form of a C-shaped groove 80. The H-shaped bar 82 fits within the C-shaped groove 80 on the extension element 44 in the same manner as the central element 42. Accordingly, when the bar 82 is positioned in the C-shaped groove 80 on both the extension element 44 and the central element 42, the bar 82 joins the extension element 44 to the central element 42. Both the extension element 44 and the central element 42 include flanges 94 that extend downward below the C-shaped grooves 80. These flanges 94 abut one another when the first and second coupling features 80, 82 join the extension element 44 to the central element 42. This abutment of the flanges 94 provides support for the extension element 44 and helps maintain the surface 60 of the extension element substantially parallel to the surface 50 of the central element 42.

While a C-groove coupling arrangement is shown in the embodiment of FIGS. 6 and 7, it will be recognized that other coupling arrangements with different first and second coupling features may be utilized in other embodiments to join the extension members 44 to the central element 42. For example, in one alternative coupling arrangement, a dovetail joint or a tongue and groove arrangement may be used in place of the C-groove and H-bar arrangement of FIGS. 6 and 7.

Figure 8:
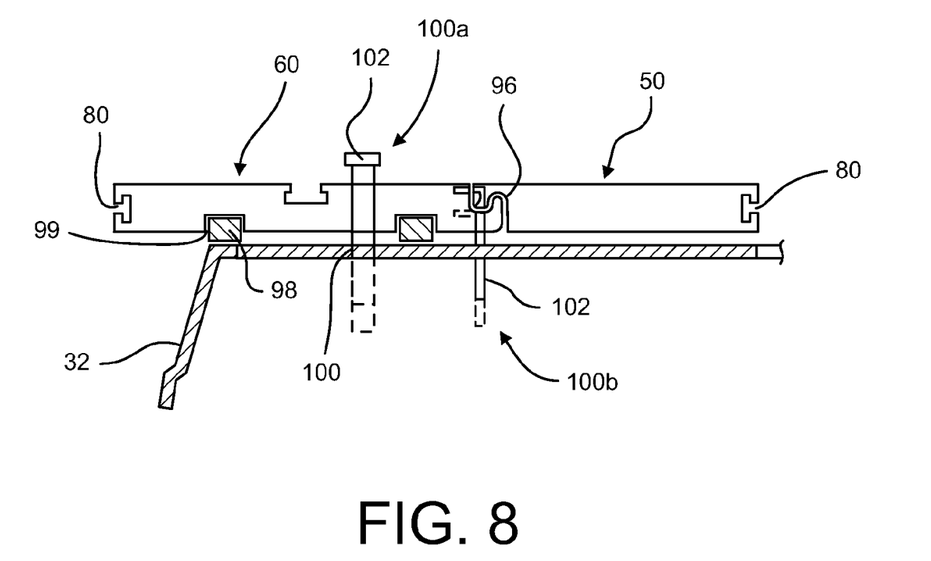
FIG. 8 shows a cross-sectional view of an embodiment of the central table top element and slideable extension element for the modular table system of FIG. 1.

FIG. 8 shows another alternative coupling arrangement where an overlapping U-joint configuration 96 is provided. This overlapping U-joint configuration may be used as one possible coupling arrangement when a slideable extension element 70 is provided adjacent to the central element 42. In this embodiment, the slideable extension element 70 includes rails 98 that rest on the table base 32, and complimentary grooves 99 that engage the upper portion of the rails 98. This allows the extension support surface 60 to slide relative to the central support surface 50. The rails may include features that facilitate smooth sliding of the extension support surface 60, such as a rounded upper portion, ball bearings, or other features to facilitate sliding.

In the embodiment of FIG. 8, the slideable extension element 70 also includes a C-groove 80 on the opposite side of the extension element 70 from the U-joint 96. This allows other extension members 44 or tool accessories to be joined to the table along the outer side of the slideable extension element 70.

Figure 9:
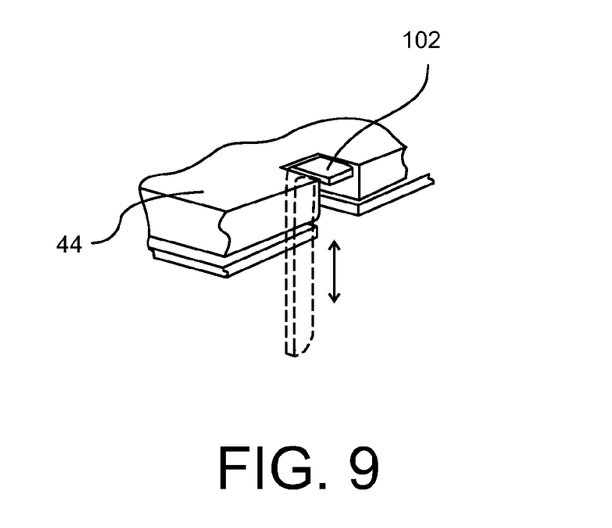
FIG. 9 shows a side view of a locking arrangement for the slideable extension element of FIG. 8.

As shown in FIGS. 8 and 9, the slideable extension element 70 includes a locking arrangement 100 that allows the slideable extension element 70 to be locked in place relative to the central element 42. In this embodiment, the locking arrangement 100 includes a lever 102 that engages the table base 32 when in a depressed position and is clear of the table base 32 when in an upright position. Accordingly, when the lever 102 is upright, the slideable extension element 70 is free to slide relative to the central element 42. When the lever 102 is depressed, the slideable extension element 70 is locked relative to the central element 42 and table base 32. The locking arrangement 100 is shown in two different positions in FIG. 8, including positions 100a and 100b. Accordingly, it will be recognized that the locking arrangement may be provided in any of numerous positions on the table 30. Furthermore, although the embodiment of the locking arrangement in FIGS. 8 and 9 includes the lever 102, it will be recognized that in other embodiments different locking mechanisms may be utilized.

Figure 10:
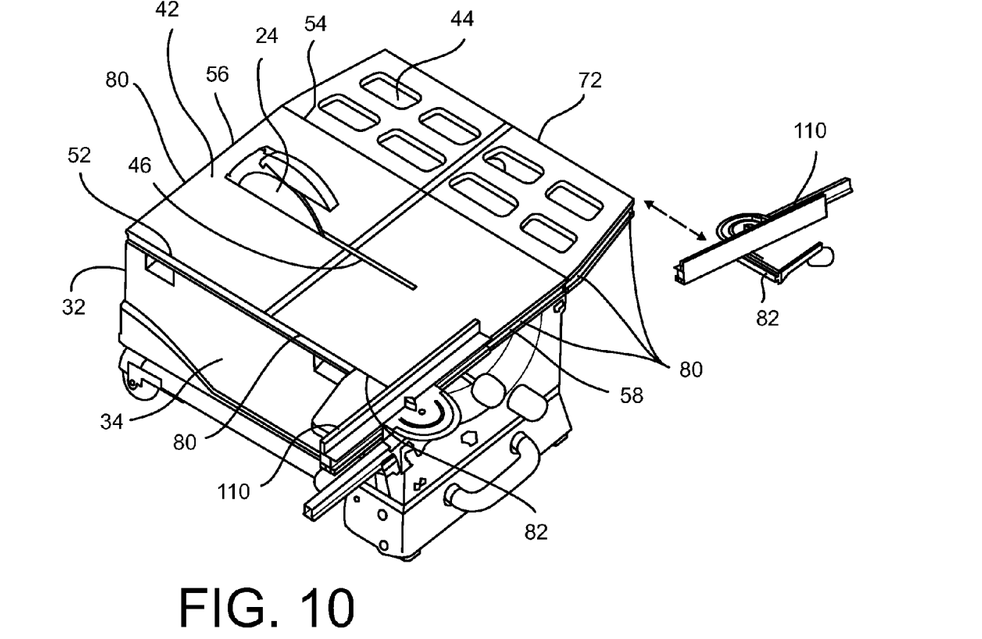
FIG. 10 shows an alternative embodiment of the modular table system of FIG. 1 with a tool accessory coupled to the table top.

With reference now to FIG. 10, an alternative embodiment of the table saw 20 is shown. In this embodiment, the extension elements 44 are slightly trapezoidal in shape and include coupling features on all four sides. The type of coupling feature on a particular side may be different depending on the particular configuration of the modular table top 40. For example, the inner side of the extension element 44 may include the second coupling feature 82 configured to allow the extension element to be joined to the first coupling feature 80 along a side of the central element 42. The opposite outer side of the extension element 44 may include the first coupling feature which allows a tool accessory or other extension element to be attached to the outer edge of the extension element 44. As used herein, the term "tool accessory" refers to a device that may be used in association with the table saw 20 or other power tool, but is not intended to serve as a generally planar table top extension member. For example, a tool accessory may include a universal fence, miter gauge, jig, holder, or any of various other tool accessories as will be recognized by those of skill in the art.

With continued reference to FIG. 10, a tool accessory in the form of a miter fence 110 is shown attached to the front perimeter 58 of the central element 42. The miter fence 110 includes the second coupling feature 82 which allows the miter fence 110 to be coupled to the first coupling feature 80 along a perimeter portion of the central element 42 or extension element 44. Dotted line 112 in FIG. 10 shows that the miter fence 110 can be removed from the front perimeter 58 of the central element and coupled to the outer perimeter of the extension element 44.

Figure 11:
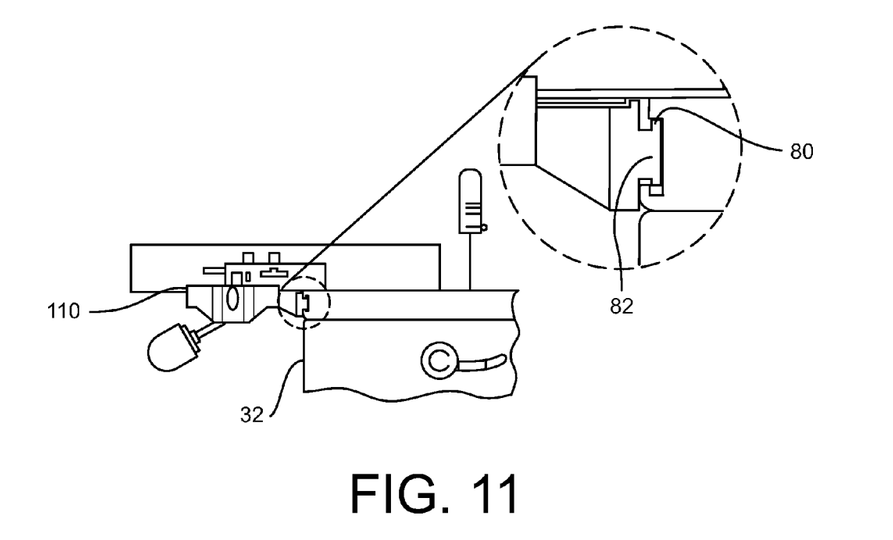
FIG. 11 shows a side view of the tool accessory of FIG. 10 coupled to the central table top portion.

FIG. 11 shows the miter fence 110 positioned along the left perimeter 52 of the central element 42. In this embodiment the first coupling feature 80 on the central element is a C-grove. The second coupling feature 82 on the miter fence 110 is a complimentary half-H feature with legs that fit within the C-groove 80. In this embodiment, the half-H feature 82 is fixed to the perimeter of the accessory 110. Accordingly, an intermediate member, such as the H-bar 82 of the embodiment of FIG. 7, is not required with the embodiment of FIG. 11 in order to couple the accessory to the central element 42 or an extension element 44

Figure 12:
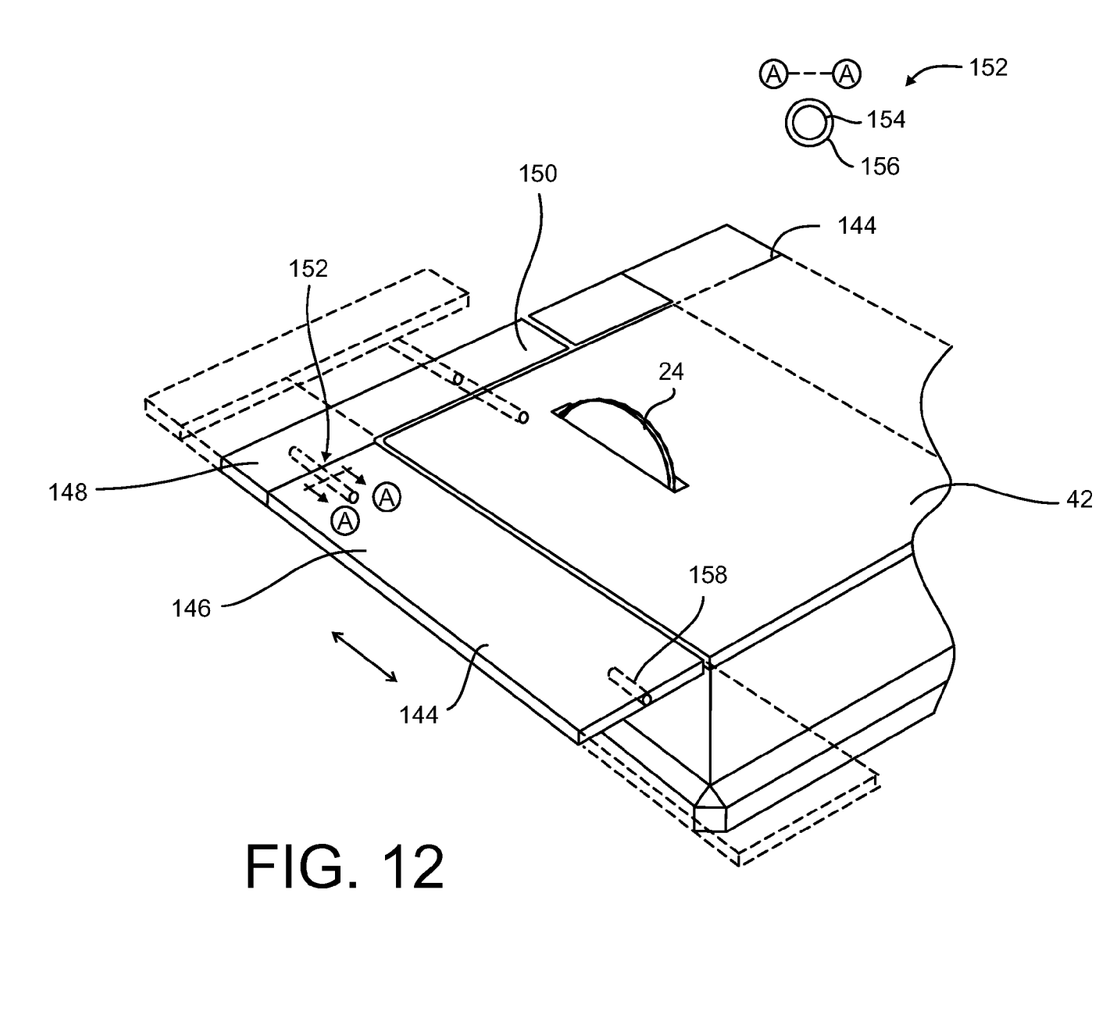
FIG. 12 shows a perspective view of an L-shaped extension member for use with the modular table system of FIG. 1.

With reference now to FIG. 12, an embodiment of the table top 40 is shown where multiple extension members of different sizes are connected together to form two L-shaped extension members 144. The two L-shaped extension members include a right and a left extension member. Each L-shape extension member 144 in FIG. 12 includes a first extension piece 146, a second extension piece 148, and a third extension piece 150. The first extension piece 146 is connected to the second extension piece 148 by a connecting rod system. The third extension piece 150 is also connected to the central element 42 by a connecting rod system 152. The connecting rod system includes a first rod 154 positioned in one extension piece (e.g., 146, 42) that is journaled within a second rod 156 on another extension piece (e.g., 148, 150). The rods 154, 156 are slideable relative to each other to allow the extension pieces 144, 146, 148 to slide relative to each other along the axes of the rods. Rod cavities 158 are provided in the sides of the extension pieces 144, 146, 148 and the central element 42 to allow the connecting rods 154, 156 to be secured thereto and facilitate use of the connecting rod system 154.

Figure 13:
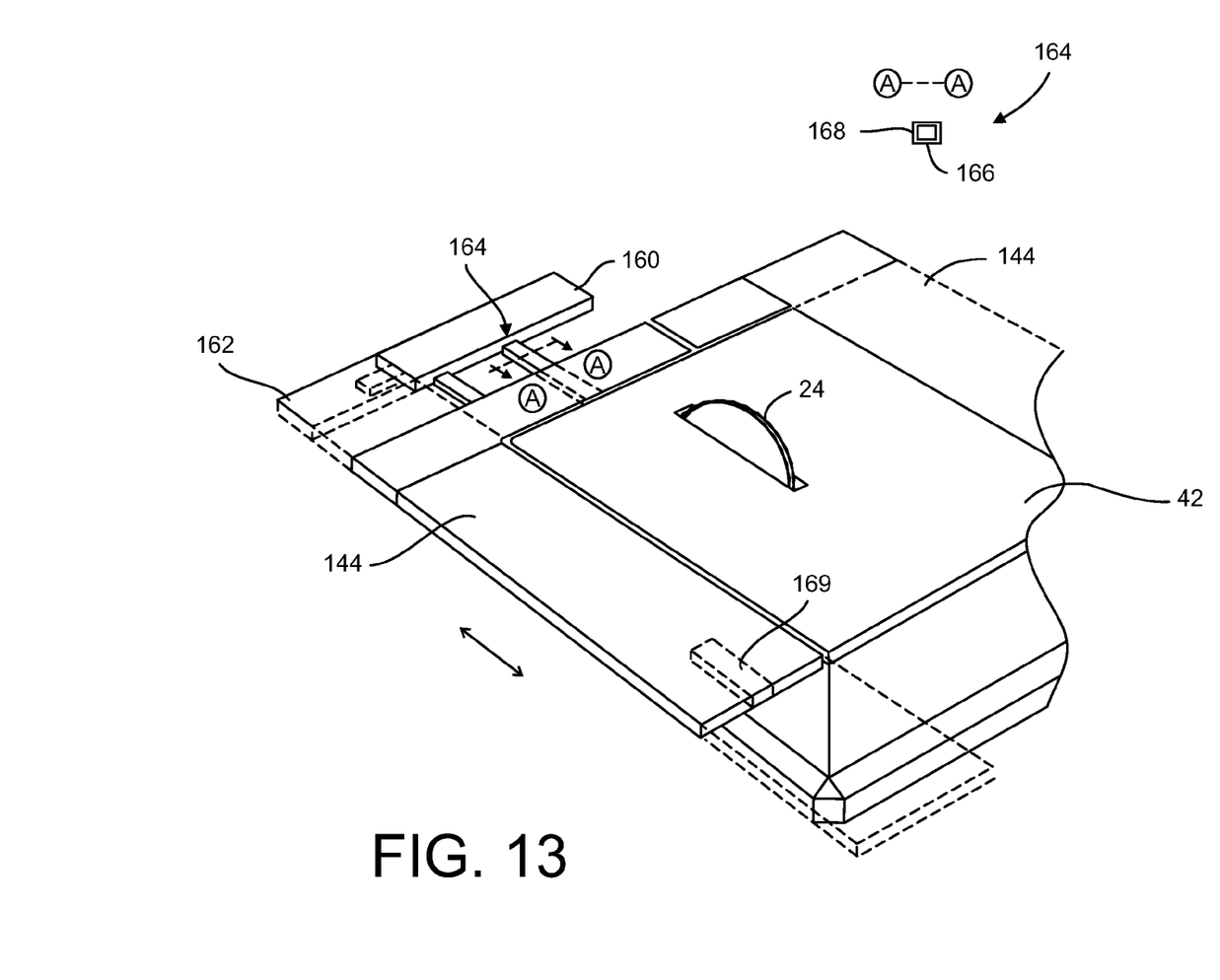
FIG. 13 shows the L-shaped extension member of FIG. 12 with an additional slideable extension coupled to the L-shaped extension member.

With reference now to FIG. 13, an alternative embodiment of the L-shaped extension member of FIG. 12 is shown with an additional extension elements 160, 162 slideably connected to the L-shaped extension member 144. Instead of a connecting rod system with round rods as shown in FIG. 12, the connecting rod system 164 of FIG. 13 includes rectangular rods 166 and 168 with rectangular cavities 169 in the extension members 144. In addition, the modular arrangement of FIG. 13 provides the ability to extend both the L-shaped extension element 144 as well as the additional extension elements 160 and 162 relative to the central element 42.

Figures 14A, 14B:
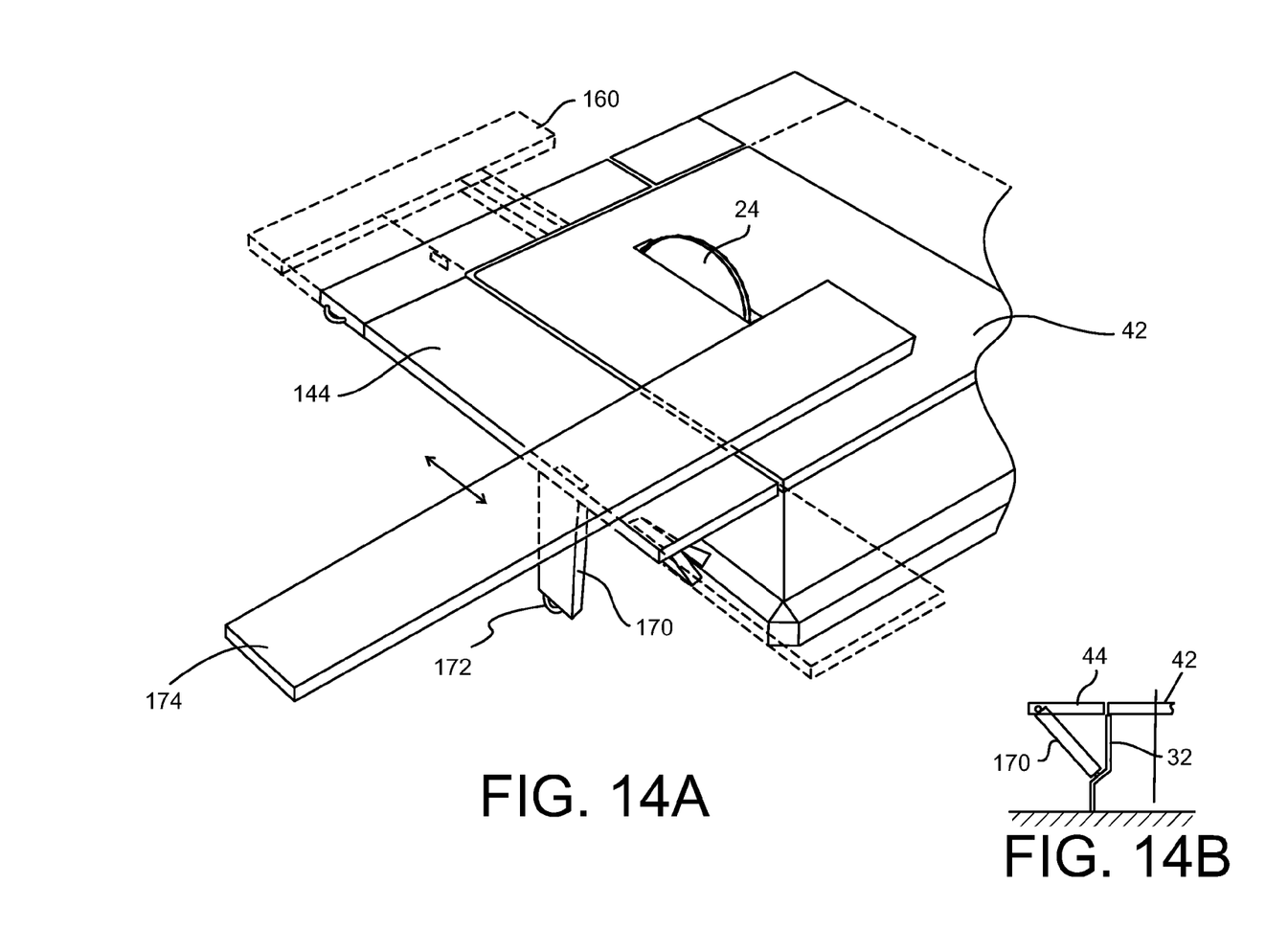
FIG. 14A shows the L-shaped extension member of FIG. 12 with a support member.
FIG. 14B shows an alternative embodiment for the support member of FIG. 14A.

With reference now to FIGS. 14A and 14B, the L-shaped extension member 144 of FIG. 13 is shown with the addition of a support member 170. The support member 170 is provided in the form of a beam that extends downward from the underside of the extension member 144. In the embodiment of FIG. 14A, the beam 170 extends downward from the extension member 144 in a generally perpendicular fashion. The end of the beam opposite the extension member 144 engages the floor. In the embodiment of FIG. 14B, the beam 170 extends downward from the extension member 144 and back toward the table base 32, such that the beam 170 and the extension member 144 form an acute angle. The end of the beam 170 opposite the extension member 144 engages the base 32. In both of the embodiments of FIGS. 14A and 14B, the beam may include wheels 172 to facilitate sliding of the extension member 144. In any event, the beam 170 provides additional support for the extension member 144, helping maintain the extension member 144 in a plane that is parallel to the central element 42 even when a heavy workpiece 174 rests on the extension member 144.

In operation, the modular table system for table saws disclosed herein provides the user of the system with great flexibility for individualized cuts on workpieces of different sizes. The system may include various extension elements that are generally exchangeable and may be selectively positioned at the side, rear or even front of the table. The system allows for extension members of various sizes and shapes to be joined to various table parts, including connection to the central element and connections to other extension members. The extensions may be fixed or static relative to each other and the central table element. The system also allows for tool accessories to be utilized in association with the central table element and any extensions. Moreover, the various elements of the modular table system may be produced uniformly and at a relatively low cost using molded or extrusion elements.

The foregoing detailed description of one or more embodiments of the modular table system for table saws has been presented herein by way of example only and not limitation. It will be recognized that there are advantages to certain individual features and functions described herein that may be obtained without incorporating other features and functions described herein. Moreover, it will be recognized that various alternatives, modifications, variations, or improvements of the above-disclosed embodiments and other features and functions, or alternatives thereof, may be desirably combined into many other different embodiments, systems or applications. Presently unforeseen or unanticipated alternatives, modifications, variations, or improvements therein may be subsequently made by those skilled in the art which are also intended to be encompassed by the appended claims. Therefore, the spirit and scope of any appended claims should not be limited to the description of the embodiments contained herein.

What is claimed is:

1. A table tool comprising:
   a table including a table base and a table top, the table top including a central table top portion fixed to the table base, the central table top portion including a left perimeter, a right perimeter, a front perimeter and a rear perimeter, the left perimeter, the right perimeter, and the rear perimeter each including a first coupling feature, the table base including a first extension support portion that extends laterally beyond the left perimeter of the central table top portion and a second extension support portion that extends laterally beyond the right perimeter of the central table top portion;
   a power tool carried by the table, the power tool including a cutting instrument that extends through an opening in the central table top portion;
   a first table top extension having a perimeter and including a second coupling feature on the perimeter configured to be selectively and slidably coupled to the first coupling feature on the left perimeter and the right perimeter of the central table top portion, the first table top extension including a sliding assembly that is configured to be supported by the first extension support portion when the first table top extension is coupled to the left perimeter of the central table top portion and supported by the second extension support portion when the second table top extension is coupled to the right perimeter of the central table top portion, the sliding assembly enabling the first table top extension to slide relative to the central table top portion; and
   a second table top extension having a perimeter and including a third coupling feature on the perimeter configured to be selectively and statically coupled to the first coupling feature on the left perimeter, the right perimeter, and the rear perimeter of the central table top portion with the second table top extension fixed relative to the central table top portion, the second table top extension being supported by the first extension support portion when the second table top extension is coupled to the left perimeter of the central table top portion and supported by the second extension support portion when the second table top extension is coupled to the right perimeter of the central table top portion,
   wherein, when the second table top extension is coupled to the rear perimeter of the central table top portion and the first table top extension is coupled to one of the left perimeter and the right perimeter of the central table top portion, the third coupling feature on the perimeter of the second table top extension is configured to be coupled to both the first coupling feature on the rear perimeter of the central table top portion and to the second coupling feature on a rear perimeter of the first table top extension.

2. The table tool of claim 1 further comprising a third table top extension having a perimeter and a fourth coupling feature on the perimeter configured to be selectively coupled to the first coupling feature on the left perimeter, the right perimeter, and the rear perimeter of the central table top portion with the third table top extension fixed relative to the central table top portion and the second table top extension, wherein, when the third table top extension is coupled to the rear perimeter of the central table top portion and the first table top extension and second table top extension are coupled to the left perimeter and the right perimeter of the central table top portion, the fourth coupling feature on the perimeter of the third table top extension is configured to be coupled to the first coupling feature on the rear perimeter of the central table top portion, to the second coupling feature on the rear perimeter of the first table top extension, and to the third coupling feature on a rear perimeter of the second table top extension.

3. The table tool of claim 2 wherein the second, third and fourth coupling features are respectively removably attached to the first table top extension, second table top extension, and third table top extension.

* * * * *